United States Patent
Min et al.

(10) Patent No.: US 10,952,451 B2
(45) Date of Patent: Mar. 23, 2021

(54) SYSTEM AND METHOD FOR PRODUCING A NON-DAIRY CHEESE PRODUCT

(71) Applicant: WhiteWave Services, Inc., Denver, CO (US)

(72) Inventors: Xiaoyu Min, Eugene, OR (US); Joshua James Smith, Eugene, OR (US); Wendy Kay Behr, Arvada, CO (US); Jennifer Lynn Aleshire, Springfield, OR (US)

(73) Assignee: WhiteWave Services, Inc., Denver, CO (US)

( * ) Notice: Subject to any disclaimer, the term of this patent is extended or adjusted under 35 U.S.C. 154(b) by 123 days.

(21) Appl. No.: 15/484,375

(22) Filed: Apr. 11, 2017

(65) Prior Publication Data

US 2018/0289028 A1   Oct. 11, 2018

(51) Int. Cl.
*A23C 20/02* (2021.01)
*A23C 19/097* (2006.01)
*A01J 99/00* (2006.01)

(52) U.S. Cl.
CPC .......... *A23C 20/02* (2013.01); *A01J 99/00* (2013.01); *A23C 19/097* (2013.01)

(58) Field of Classification Search
CPC ......... A23C 20/02; A23C 19/097; A01J 99/00
USPC ...................................... 426/51, 46
See application file for complete search history.

(56) References Cited

U.S. PATENT DOCUMENTS

| | | | |
|---|---|---|---|
| 3,944,676 A | 3/1976 | Fridman et al. | |
| 3,982,025 A * | 9/1976 | Hashimoto | A23C 20/025 426/46 |
| 5,080,912 A * | 1/1992 | Bodenstein | A23C 19/055 426/33 |
| 6,777,016 B2 * | 8/2004 | Thresher | A23C 20/005 426/578 |
| 2006/0062885 A1 | 3/2006 | Jacobson | |

FOREIGN PATENT DOCUMENTS

| | | |
|---|---|---|
| CN | 102835460 B | 6/2014 |
| EP | 1364583 | 11/2003 |
| EP | 1749448 | 2/2007 |
| RU | 2259050 C2 | 8/2005 |
| WO | 2014110540 A1 | 7/2014 |
| WO | WO2014/110540 | 7/2014 |
| WO | 2015127388 A1 | 8/2015 |
| WO | WO2015/127388 | 8/2015 |

OTHER PUBLICATIONS

Chavan, R. S. et al. Int. J. Food Sci. Technol. Nut. 2: 25-39 (2007) (Year: 2007).*
Rui, X et al. Food Funct. 6:622-629 (2015) (Year: 2015).*
Anonymous: Meltable Dairy-Free Cheese (Soy-Free Vegan, & Paleo) by Magda Jan. 16, 2016, XP055482204, Retrieved from the Internet: URL:http://idelicient.com/meltable-dairy-free-cheese/ [retrieved on Jun. 7, 2018] Ingredients Instructions, 20 pages.
Anonymous: "Sharp Vegan Cheddar Cheese Alternative Recipe—Go Dairy Free" Jan. 29, 2013, XP055482206, Retrieved from Internet: URL:https//www.godairyfree.org/recipes/sharp-cheddar-vegan-cheese-alternative [retrieved on Jun. 7, 2018] Ingredients Instructions, 6 pages.
Anonymous: "Smoked Coconut Gouda (Part Deux) and the #cheesegate Incident Vedged Out", Nov. 21, 2014 XP055482208, retrieved from the Internet: URL:https://vedged.com/2014/11/21/smoked-coconut-gouda-part-deux-and-the-cheesegate-incident/ [retrieved on Jun. 7, 2018] list of ingredients method, 26 pages.
PCT Initation to Pay Additional Fees and Where Applicable, Protest Fee, International Application No. PCT/US2018026797, dated Jun. 20, 2018, 15 pages.
PCT Notification of Transmittal of the International Search Report and the Written Opinion of the International Searching Authority, or the Declaration, International Application No. PCT/US2018/026797; 19 pages; dated Aug. 16, 2018.
PCT International Preliminary Report on Patentability Re. Application No. PCT/US2018/026797 dated Oct. 15, 2019.
CA Examination Report Re. Application No. 3,058,199 dated Dec. 7, 2020.
RU Office Action and Search Report for Patent Application No. 2019135844 dated Aug. 11, 2020.

* cited by examiner

*Primary Examiner* — Hamid R Badr
(74) *Attorney, Agent, or Firm* — Baker Botts L.L.P.

(57) ABSTRACT

A method of producing a non-dairy cheese includes fermenting non-dairy milk with lactic acid bacteria and mixing the fermented non-dairy milk with dry ingredients. The dry ingredients include one or more gums and one or more starches. The method further includes heating the fermented non-dairy milk and dry ingredients to 180 degrees and mixing oil into the fermented non-dairy milk in an in-line high shear mixer creating an oil/non-dairy milk mixture. The method further includes circulating the oil/non-dairy milk mixture through the inline high shear mixer until the droplet size of the oil in the non-dairy milk is 15 micrometers or less, removing air from the oil/non-dairy milk mixture, and packaging the oil/non-dairy milk mixture to yield a non-dairy cheese product.

10 Claims, 2 Drawing Sheets

SYSTEM AND METHOD FOR PRODUCING A NON-DAIRY CHEESE PRODUCT

TECHNICAL FIELD OF THE DISCLOSURE

This invention relates in general to a system and method of producing a cheese product, and more particularly to producing a non-dairy cheese product.

BACKGROUND

Cheeses are popular food products for their nutritional value and taste. Some consumers avoid consuming dairy products, including dairy cheeses, yogurts, and sauces. Typical non-dairy alternative to cheese products often, however, fail to adequately simulate the taste, texture, consistency, and appearance of dairy cheese products. In many cases, consumers forego any type cheese or cheese-imitation products because the non-dairy alternatives do not provide an adequate substitute.

SUMMARY

Particular embodiments described herein include a method for producing a non-dairy cheese. According to some embodiments, a method of producing a non-dairy cheese includes fermenting non-dairy milk with lactic acid bacteria and mixing the fermented non-dairy milk with dry ingredients. The dry ingredients include one or more gums and one or more starches. The method further includes heating the fermented non-dairy milk and dry ingredients to 180 degrees and mixing oil into the fermented non-dairy milk in an in-line high shear mixer creating an oil/non-dairy milk mixture. The method further includes circulating the oil/non-dairy milk mixture through the inline high shear mixer until the droplet size of the oil in the non-dairy milk is 15 micrometers or less, removing air from the oil/non-dairy milk mixture, and packaging the oil/non-dairy milk mixture to yield a non-dairy cheese product.

Particular embodiments described herein include a non-dairy cheese product. According to some embodiments, a non-dairy cheese product includes fermented non-dairy milk. The non-dairy milk is fermented with lactic acid bacteria. The non-dairy cheese product further includes one or more starches, one or more gums, and oil. The oil forms an emulsion in the non-dairy milk. The oil has a droplet size of 15 micrometers or less.

Further embodiments described herein include an system including a first blender, a pasteurizer, an incubator, a second blender, a heating vessel, an inline high shear mixer, a de-aeration tank, and a vertical form, fill, and seal apparatus. The first blender mixes a non-dairy milk with dry ingredients to a substantially uniform consistency. The pasteurizer receives blended non-dairy milk and pasteurizes the non-dairy milk. The incubator ferments the non-dairy milk with lactic acid bacteria at 90 degrees or higher for 8 to 14 hours. The second blender blends the fermented non-dairy milk with other dry ingredients. The dry ingredients include one or more starches and one or more gums. The heating vessel heats the mixture with the fermented non-dairy milk to at least 180 degrees. The inline high shear mixer is coupled to the heating vessel. The inline high shear receives a flow of the mixture containing the fermented non-dairy milk, receives an oil, mixes the oil into the flow of the mixture containing the fermented non-dairy milk, and circulates the oil and mixture to the heating vessel. The de-aeration tank removes air from the heated mixture. The vertical form, fill, and seal apparatus receives the mixture from the de-aeration tank and packages the mixture to yield a non-dairy cheese product.

Certain embodiments of the present disclosure may provide one or more technical advantages. As an example, fermenting non-dairy milk with lactic acid bacteria typically used in dairy cheese production creates a flavor profile similar to that of a dairy cheese. Furthermore, certain strains of lactic acid bacteria may be chosen to simulate the flavor profiles of different dairy cheeses. For example, the strains of bacteria used to produce a certain dairy Mozzarella cheese may be used to ferment the non-dairy milk in order to produce a non-dairy cheese with flavors similar to the dairy Mozzarella cheese.

In addition, oil may be mixed with the fermented non-dairy milk in order to increase the fat content of the non-dairy cheese product. By mixing the oil into the fermented non-dairy milk through an inline high shear mixer, the average droplet size of the oil may be reduced to 15 micrometers or less. Reducing the droplet size not only enhances emulsion stability of the oil in the non-dairy milk, but also provides an optimal mouthfeel and consistency of the non-dairy cheese product.

As another example, certain gums and starches may be added to the fermented non-dairy milk. Certain starches, such as de-branched waxy starches, may replace the utility of casein in dairy cheese in order to provide structure and certain physical properties to the non-dairy cheese, allowing, for example, the non-dairy cheese product to be melted and then reformed like dairy cheeses. In addition, gums, e.g., Konjac and Xanthan gums, may be added to provide the non-dairy cheese with firmness allowing the cheese to be shredded or sliced. Certain starch and/or plant-based protein may be added to stabilize the emulsion of oil in the fermented non-dairy milk.

Other technical advantages of the present disclosure will be readily apparent to one skilled in the art from the following figures, descriptions, and claims. Moreover, while specific advantages have been enumerated above, various embodiments can include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
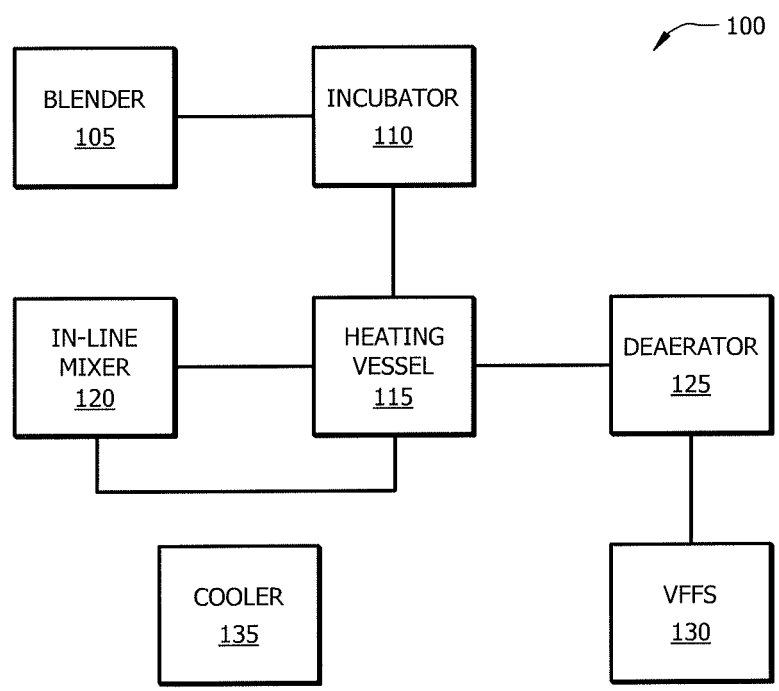
FIG. 1 illustrates an example system capable of producing a non-dairy cheese product, according to some embodiments.

There is a growing demand for non-dairy products stemming from a growing number of consumers who choose not to consume foods from animal sources, in addition to those consumers having certain medical or dietary restrictions. Despite their aversion to dairy products, the taste of cheese products remains appealing.

Typically, dairy cheeses are produced from milk by first culturing the milk and then adding rennet to cause the casein protein present in dairy milk to precipitate to form cheese curds. Different cultures may be used to provide the cheese with different flavors, but all dairy cheeses require the use of the rennet to form the cheese curds. The converted casein provides the cheese its structure so that the cheese may be sliced, shredded, stretched, or may melt. After the curds are formed, water and expelled whey are removed and the remaining curds are formed into the dairy cheese.

The formation of a non-dairy cheese may require a replacement of the functionality provided by casein found in dairy milk. As described above, the presence and conversion of the casein is essential to forming the solid dairy cheese. Previous attempts of making imitation cheeses, or non-dairy cheese substitutes, used a non-fermented base combined with thickening agents to provide the structure for the imitation cheese. These imitation cheeses required the introduction of artificial flavors to recreate the flavor of the dairy cheeses they were attempting to imitate. These imitation cheeses often failed to faithfully replicate the flavors and textures of the dairy cheeses. As a result, consumers often forego any type of cheese product because the non-dairy alternatives do not provide an adequate substitute.

As demonstrated above there are several issues with producing a non-dairy cheese. First, replicating the flavors of a certain dairy cheese with artificial flavors will always be imperfect and may require the use of undesirable chemicals, such as compound flavors and certain acids. In certain embodiments, aspects of the present disclosure resolve this issue by providing the flavor to a non-dairy milk through the use of cultures of bacteria. For example, bacteria traditionally used in making a Mozzarella cheese may be introduced to the non-dairy milk. In this manner, the culture may produce a similar flavor, resulting in an improved non-dairy cheese of simulating the corresponding dairy cheese. Because the flavor provided by the culture to the non-dairy cheese simulates that of the dairy cheese, little or no additional flavors may be added.

Second, the consistency of previous imitation cheese products have differed from that of a dairy cheese. While thickening agents may have provided an imitation cheese product with structure, the imitation cheese products have failed to replicate the consistency and other physical properties of the dairy cheese. Furthermore, added fats to imitation cheese products have negatively altered the texture of the imitation cheeses. In dairy cheese, the converted casein protein provides a matrix trapping milk fats. When trapped this way, the milk fats provides flavor and texture associated with dairy cheeses. Fats are often added to produce an imitation cheese, but without the casein, the fats must be emulsified, which may affect the texture and flavor of the imitation cheese.

In certain embodiments, aspects of the present disclosure address this second concern by introducing gums and starches to provide characteristics and consistency exemplified by various dairy cheeses and adding fats through oils emulsified in the non-dairy substrate. For example, certain de-branched waxy starches and combinations of different gums may allow embodiments of the non-dairy cheese to melt like dairy cheese when exposed to heat and reform when cooled and be shredded or sliced while still maintaining its structure. The introduction of oils through an inline high shear mixer reduces the droplet size of the oil in the non-dairy milk. By reducing the droplet size, a person may not perceive the oil separate from the non-dairy substrate. Furthermore, the introduction of starches or plant-based proteins may aid in maintaining the droplets within the non-dairy milk as an emulsion.

For purposes of example and explanation, certain embodiments throughout the disclosure describe adding ingredients, such as dry ingredients or an oil, to non-dairy milk. Non-dairy milk is only one example of a non-dairy product to which this disclosure is directed. The present disclosure also contemplates the use of any non-dairy milk-like products, such as a non-dairy cream, to produce the non-dairy cheese. For example, the disclosure may refer to using a coconut milk or coconut cream to produce a non-dairy cheese. Furthermore, references to "non-dairy milk" or "non-dairy cream" may refer to any non-animal-sourced beverage or cream-like substance. Examples of non-dairy milks include almond milks, cashew milks, soy milks, coconut milks, rice milks, flax milks, etc. Additionally, the use of cream-like products derived from similar or the same non-dairy sources are also contemplated. Any suitable combination of one or more non-dairy milks and/or dairy creams may be used. As an example, coconut milk could be used or a mixture of a coconut milk and a nut milk could be used.

Figure 2:
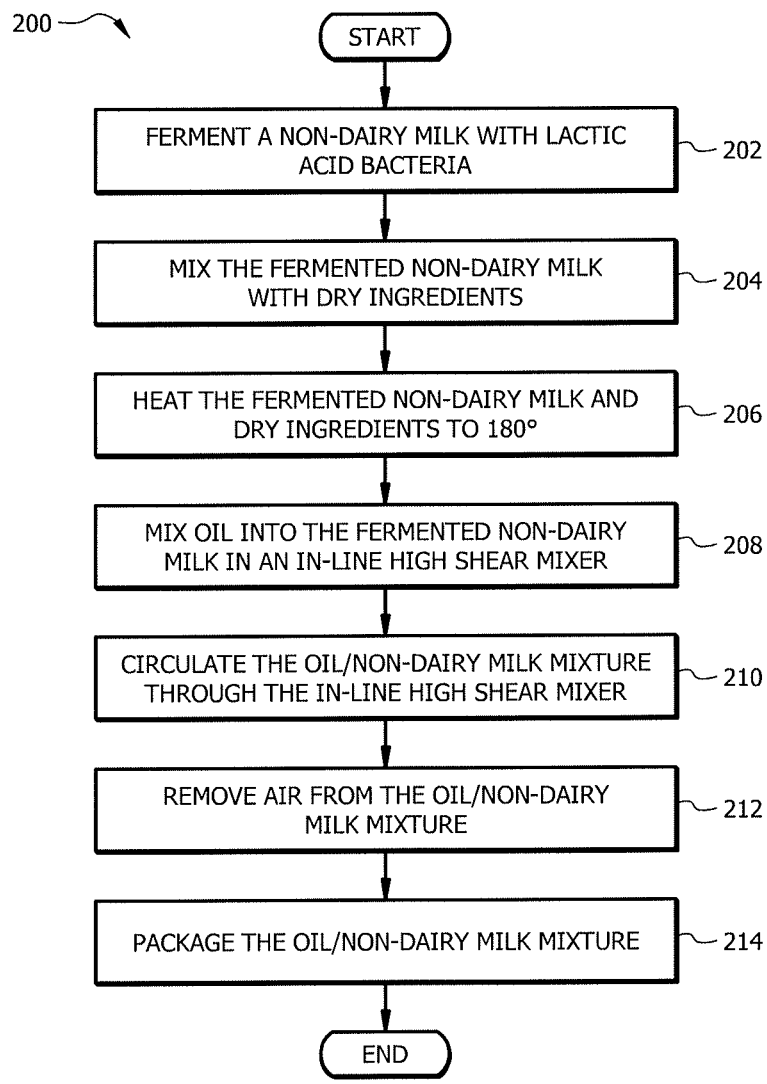
FIG. 2 illustrates an example method of producing a non-dairy cheese product, according to some embodiments.

Methods and systems addressing these problems will be described in more detail using FIGS. 1 and 2. FIG. 1 illustrates an example system capable of producing a non-dairy cheese, according to some embodiments. FIG. 2 illustrates an example method of producing a non-dairy cheese, according to some embodiments. Embodiments of the present invention and its advantages are best understood by referring to FIGS. 1 and 2 of the drawings, like numerals being used for like and corresponding parts of the various drawings.

FIG. 1 illustrates an example system capable of producing a non-dairy cheese, according to some embodiments. According to certain embodiments, system 100 includes a blender 105, an incubator 110, a heating vessel 115, an inline mixer 120, a de-aerator 125, a vertical form, fill, and seal machine ("VFFS") 130, and a cooler 135.

An operator may introduce a non-dairy milk along other ingredients to blender 105. Blender 105 may mix the non-diary milk with the other ingredients, e.g., dry or wet ingredients, to produce a substantially uniform mixture. Blender 105 may comprise one or more blending or mixing components. In certain embodiments, Blender 105 comprising a first mixing component that introduces the additional ingredients to the non-dairy milk and a second mixing component that is configured to unsure more uniform mixing. For example, the second mixing component could include a high shear mixer. Blender 105 may also reduce the particle size of the non-dairy milk and any other introduced ingredients, such plant based ingredients, to blend the ingredients together and prepare the non-dairy milk for culturing. For example, reducing the average particle size of the non-dairy milk, and other ingredients, may enhance the culturing of lactic acid bacteria.

In certain embodiments, blender 105 may blend the non-dairy milk with other ingredients before fermentation. The additional ingredients may impact the taste of the non-dairy cheese product, or affect the process of fermentation by lactic acid bacteria. For example, blender 105 may blend the non-dairy milk with dextrose, sodium citrate and a plant-based protein. As another example, blender 105 may blend the non-dairy milk with navy bean flour.

Blender 105 may include one or more means for blending, mixing, combining, stirring, and/or agitating the combination of ingredients. For example, blender 105 may include mechanical agitators, pressure jets, or other suitable mixing devices, whether located within blender 105 or external to blender 105. Alternatively, blender 105 may allow for stirring or mixing by hand. In some embodiments, blender 105 may include a jacketed or insulated tank to maintain appropriate temperatures, blender 105 may also include one or more discharge outlets coupled to other components of system 100, such as incubator 110. In certain embodiments may comprise more than one blending component. For example, a first blender component may be used mainly to blend the ingredients together and a second blender component may be configured mainly to reduce the particle size.

In certain embodiments, system 100 includes a pasteurizer, not depicted, in which the non-dairy milk may be pasteurized. The pasteurizer heat processes the non-dairy milk, and any added ingredients, to kill pathogenic bacteria. In addition, the pasteurizer may also remove any safe, but undesirable, bacteria from the non-dairy milk. By removing the unneeded bacteria, pasteurizer reduces the off-flavors that may occur during the culturing in incubator 110.

Bacteria may be added to the non-dairy milk in incubator 110. After the introduction of the bacteria, incubator 110 may maintain the non-dairy milk at a certain temperature or within a certain temperature range to enable the growth of a culture of the introduced bacteria. In certain embodiments, incubator 110 is configured to maintain the non-dairy milk at a desired culture temperature. For example, incubator 110 may maintain the non-dairy milk at a temperature within the range of 90 degrees Fahrenheit to 104 degrees Fahrenheit, a range wherein the culturing of certain bacteria is optimized. Incubator 110 may allow the non-dairy milk to ferment for a predetermined period of time. In certain embodiments, incubator 110 may hold the non-dairy milk for culturing for eight to fourteen hours. After sufficient fermenting, e.g., after reaching a defined acidity level, the fermented non-dairy milk may be moved from incubator 110 to heating vessel 115.

In certain embodiments, system 100 may further include an additional blender. The additional blender may mix dry ingredients into the fermented non-dairy milk before it is moved to heating vessel 115. In particular embodiments, the additional blender mixes one or more gums and starches into the fermented non-dairy milk. In certain embodiments, plant-based protein may be introduced into the fermented non-dairy milk before it is moved to heating vessel 115.

The fermented non-dairy milk and any added dry ingredients may be moved to heating vessel 115. Heating vessel 115 may be any suitable vessel able to heat the fermented non-dairy milk to a temperature of at least 180 degrees Fahrenheit and maintain the non-dairy milk at that temperature. For example, heating vessel 115 may be a steam jacketed kettle with a scraper stirrer. In this manner, heating vessel 115 may allow the introduced starches to gelatinize and the introduced gums to hydrate. As a result, a lower viscosity may be provided, which may enable a more effective emulsification of oil into the mixture.

Heated fermented non-dairy milk, including the introduced starches and gums, may flow from heating vessel 115 into inline mixer 120 and flow back to heating vessel. At inline mixer 120, fat may be introduced to a flow of the non-dairy milk. In certain embodiments, the introduced fat may first be heated to a temperature in the range of 170 to 180 degrees Fahrenheit. In certain embodiments, fat is introduced into the non-dairy milk through inline mixer 120 via an oil containing fat molecules. For example, a palm or coconut oil may be used to introduce fat through inline mixer 120. In some embodiments, oils are chosen based on their melting points coinciding with the melting point ranges of dairy cheeses. Inline mixer 120 provides high shear forces which mixes the oil into the portions of the non-dairy milk with the added starches and gums. By providing high shear forces, inline mixer 120 may produce droplets of oil containing fat small enough to remain in the emulsion with the non-dairy milk with added starches and gums. In certain embodiments, the inline mixer 120 may produce oil-in-non-dairy milk droplets of average size less than 15 micrometers. Inline mixer 120 may be any suitable mixer capable of causing high shear in one or more fluids inline with the flow of the one or more fluids.

In certain embodiments, a system 100 further includes a static mixer which is configured to agitate an oil before it is introduced into inline mixer 120. By first agitating the oil, the static mixer helps break up the stream of oil, which may enhance the mixing of the oil into the non-dairy milk in inline mixer 120.

Once the predetermined amount of fat (or oil) is added to the fermented non-dairy milk and the oil droplet size in emulsion is reduced, the oil/non-dairy milk mixture may move to de-aerator 125. De-aerator 125 may be configured to remove air from the oil/non-dairy milk mixture. In certain embodiments, de-aerator 125 applies a vacuum, or partial vacuum, in order to remove air from the mixture.

Vertical form, fill, and seal machine ("VFFS") 130 may receive the mixture from de-aerator 125 and package the mixture into individual packages, e.g., into blocks of non-dairy cheese product. VFFS 130 may be any suitable vertical form, fill, and seal machine, apparatus, collection of components, or system as understood by persons having skill in the art. The use of VFFS 130 limits the air introduced into the packaged non-dairy cheese. VFFS 130 may be fed a roll of film or suitable packaging material, which is then formed to provide a partially closed package. VFFS 130 may fill the partially closed package through its opening at its top with the oil/non-dairy milk mixture. Once a predetermined amount is deposited within the partially closed package, VFFS 130 may seal a portion of the package. VFFS 130 may seal around the package in contact with the oil/non-dairy milk mixture, thereby minimizing the air headspace within the package.

The reduction in the air within the packaged non-dairy cheese product is especially important because in some embodiments, the non-dairy mixture may have a temperature over 160 degrees Fahrenheit when packaged by VFFS 130. Since the non-dairy cheese product may be well above room temperature of the facility or space in which it is packaged, the non-dairy cheese product may produce condensation as it cools. If condensation occurs inside the package, the warm and moist environment may facilitate microbial growth. While the growth of bacteria is desired at certain points in the production of the non-dairy cheese product, additional microbial growth after packaging may limit shelf life and impact taste and/or the appearance of the product.

Although system 100 is described using VFFS 130, any other suitable packaging equipment is contemplated in this disclosure. For example, system 100 may alternatively include a cheese mold packaging apparatus, a Rotary Molder chiller ("RMC"), or a bag-in box-filler packager. A person having skill in the art would recognize the various methods and systems that may be used to package the non-dairy cheese product.

Once packaged, the non-dairy cheese product may be moved to cooler 135. In certain embodiments, cooler 135 is configured to cool palletized packages of the non-dairy cheese to 40 degrees Fahrenheit or colder in 24 hours or less. By reducing the temperature quickly, cooler 135 may inhibit the coalescence of the oil within the non-dairy cheese. At higher temperatures, the non-dairy cheese may not be completely solid. The oil within the non-dairy cheese, despite its small droplet size, may coalesce together given enough time. Cooling the non-dairy cheese in cooler 135 over a period of less than 24 hours allows the non-dairy cheese to solidify with reduced coalescence. The cooled non-dairy cheese may be stored at cool temperatures, e.g., below 40 degrees, to prevent microbial growth and any spoliation.

In certain embodiments, cooler 135 comprises a forced air component, e.g. a fan, to decrease the cool-down time of the non-dairy cheese. For example, the forced air component may be configured to force air through separated sections of the palletized non-dairy cheese product in order to increase heat transfer from the non-dairy cheese product to the cooled air.

Modifications, additions, or omissions can be made to system 100 without departing from the scope of the invention. The components of system 100 can be integrated or separated. Moreover, the operations of system 100 can be performed by more, fewer, or other components.

FIG. 2 illustrates an example method of producing a non-dairy cheese product, according to some embodiments. Method 200 begins with a non-dairy milk. The non-dairy milk may be in a liquid form or in a cream-like form, as further discussed below, and may be combined with any suitable ingredients, e.g., to facilitate fermentation or improve the properties of the non-dairy cheese product. In step 202, the non-dairy milk is fermented with lactic acid bacteria. The lactic acid bacteria provide a flavor profile to the non-dairy milk similar to those found in dairy cheeses. Some examples of lactic acid bacteria that may be used in producing a non-dairy cheese product include, but are not limited to, *Streptococcus thermophilus, Lactobacillus bulgaricus, Lactococcus lactis*, and *Leuconotoc cremoris* strains. By using fermented non-dairy milk fermented with similar or the same lactic acid bacteria as used in fermenting dairy milk in producing a particular type of dairy cheese, the non-dairy cheese product flavor profile may correspond to that of the particular type of dairy cheese. For example, the non-dairy milk may be fermented with lactic acid bacteria to provide flavor profiles similar to dairy Cheddar cheeses, dairy Mozzarella cheeses, dairy Jack cheeses, diary Parmesan cheeses etc. In this manner, a non-dairy cheese product may be an improved alternative to other cheese imitation products.

Once fermented, the non-dairy milk may be mixed with other ingredients. In step 204, the fermented non-dairy milk may be mixed with dry ingredients. The dry ingredients may include one or more gums and one or more starches. In certain embodiments, the one or more gums mixed with the fermented non-dairy milk include Xanthan gum and Konjac gum. In certain embodiments, the one or more starches blended with the fermented non-dairy milk include a de-branched waxy starch prepared by enzymatically hydrolyzing alpha 1,6-D-glycosidic bonds. The dry ingredients may also include salt and other seasoning ingredients, such as yeast extract and acids.

In step 206, the non-dairy milk and dry ingredients are heated to at least 180 degrees Fahrenheit. Heating may gelatinize and hydrate the starches and gums. For example, the complete hydration of certain gums may only occur above certain temperatures. The hydration of Konjac gum and Xanthan gum together may provide synergistic effects. Gelatinizing the starches may allow the starch granules to swell and break down, causing the leaching of amylose, which may then form a starch paste. The cooling of a hot starch paste may result in a viscoelastic, firm and rigid gel, which may provide structure to the non-dairy cheese product once cooled.

In step 208, oil is mixed into the fermented non-dairy milk in an inline high shear mixer. The oil may be heated prior to mixing into the fermented non-dairy milk with added starches and gum. The added oil may improve the mouthful of the non-dairy cheese product to more closely simulate that of a dairy cheese. Additionally, the added oil may also produce a non-dairy cheese product with similar nutritional qualities to those in dairy cheeses. Oil soluble color and flavoring may be added to the oil to further simulate the appearance and taste of dairy cheese. The resulting oil/non-dairy milk mixture may be circulated through an inline mixer in step 210. The circulation in step 210 may continue until the average droplet size of the oil in the non-dairy milk is 15 micrometers or less. By reducing the droplet size below a certain threshold, the operator may ensure that the emulsion of the oil in the non-dairy milk is stable and the texture of the non-dairy cheese is smooth and creamy.

In step 212, air is removed from the oil/non-dairy milk mixture. During mixing, air may be introduced into the mixture. By removing air from the mixture, a more dense and/or uniform product may be produced. Furthermore, the resulting non-dairy cheese product may be more stable during transportation and storage, in addition to during further processing, such as slicing or shredding. As an example, the mixture may be moved to de-aerator 125, which may use a vacuum method of removing air from the mixture. Any other suitable methods of removing air from food products may be used in step 212.

In step 214, the oil/non-dairy milk mixture is packaged to yield a non-dairy cheese product. Prior to packaging, the oil/non-dairy milk mixture may be cooled. The cooled mixture may then be introduced into forming equipment. In some embodiments, the mixture is introduced to VFFS 130, which may form blocks of non-dairy cheese product by packaging the mixture into separate containers. The packaging of the oil/non-dairy milk mixture may include removing air from around the mixture in its package or container. For example, VFFS 130 may package the mixture in such a way that reduces the air headspace within the package. The packaged oil/non-dairy milk mixture may require additional cooling before yielding the non-dairy cheese product in its final form, e.g., in a solid block. Any air in or surrounding the oil/non-dairy milk mixture may provide space for condensation inside the package or container when cooling. By removing air from the oil/non-dairy milk mixture during formation, condensation is limited, which limits undesired microbial growth and discoloration and dryness near the surface exposed to excess air.

In particular embodiments, method 200 further includes a step of adding ingredients to the non-dairy milk before fermenting. In certain embodiments, method 200 includes adding dextrose, sodium citrate, and plant-based protein to the non-dairy milk prior to fermentation. The dextrose, sodium citrate, and plant-based protein may provide a better substrate in which the lactic acid bacteria may grow and ferment the non-dairy milk. A substrate is the environment, comprising nutrients and other conditions, in which microbe or bacteria may grow. Certain non-dairy milks may not have adequate or optimal nutrients for culturing the particular bacteria used to create the flavor profiles matching dairy cheeses. By introducing additional ingredients, culturing the lactic acid bacteria may be optimized, enhancing the fermentation, and thereby flavor of the non-dairy cheese product.

In certain embodiments, fermenting non-dairy milk using the same bacteria that is used to make dairy cheese helps to create the flavor of dairy cheese, at least to the same extent. Additional ingredients may supplement the non-dairy milk (e.g., prior to fermentation) to enhance the dairy cheese flavors. For example, in certain embodiments, method 200 further includes adding navy bean flour to the non-dairy milk. The navy bean flour may provide a bitter and astringent flavor that may mimic bitter peptides found in certain dairy cheeses, such as aged cheeses. In this manner, certain dairy cheeses may be replicated more accurately by the non-dairy cheese product.

The non-dairy milk mixture may be cooled down rapidly during the formation of the non-dairy cheese product, e.g., after packaging. For example, the non-dairy milk mixture may reach temperatures of 180 degrees or more during the process of creating the non-dairy cheese product. Because the process creates an emulsion of oil in the non-dairy milk, the oil droplets may begin to coalesce if the mixture remains at a high temperature. In other words, the emulsion may not be stable if left at high temperatures. Coalescence of oil within the non-dairy cheese product may negatively impact the texture, appearance, stability, uniformity, and shelf life of the non-dairy cheese product. In certain embodiments, method 200 further includes steps preventing the undesired coagulation by cooling the oil/non-dairy cheese mixture.

In particular embodiments, method 200 further includes steps separating layers of packaged non-dairy cheese product allowing air to circulate between layers and cooling the packaged non-dairy cheese product to 40 degrees using refrigerated air. For example, a plurality of packages of the oil/non-dairy milk mixture may be placed on pallets or other types in other containers that are easily transportable. When placing the packages on the pallet or other container, each layer of the packages may be separated from the adjacent layers. For example, plastic separators may be placed between layers in order to allow air to pass through the layers of packaged non-dairy cheese product. This may increase the heat transfer away from the packaged non-dairy cheese product to the surrounding air by increasing the surface area exposed to air. By separating the layers of packaged non-dairy cheese product, the individual packages, including those in the center of the pallet, may be cooled more quickly. In some embodiments, cooling the non-dairy cheese product includes using forced air in order to decrease the cool-down time. For example, fans may be used to force chilled air between the separated layers of non-dairy cheese product to increase heat transfer away from the non-dairy cheese product.

Because the non-dairy cheese product includes an emulsion of oil, it must be cooled quickly to prevent the coagulation of the oil and any undesired microbial growth. If not separated, a pallet of the non-dairy cheese product may take up to one week to cool non-dairy cheese product near the center of the pallet to 40 degrees. By separating the layers of non-dairy cheese product, a pallet of non-dairy cheese product may be cooled to 40 degrees in under 24 hours. For example, the pallet of non-dairy cheese product may be placed within a cooling space, e.g. a refrigerated space, a cooled enclosure, a walk-in cooler, etc., and exposed to refrigerated air. The refrigerated air may remove heat from the non-dairy cheese product, cooling it to a temperature of 40 degrees of less. At this temperature, microbial growth is inhibited and coagulation of oil is limited.

While certain embodiments described herein refer to blocks of cheese, certain aspects of the disclosure contemplate other forms of non-dairy cheese product. For example, the non-dairy cheese product may be a sauce or another non-solid food product, such as a mayonnaise substitute. Steps of method 200 may also apply to producing such non-dairy cheese products. While certain embodiments would not form a solid block, the various non-dairy cheese products may be contained in packaging which gives the non-dairy food product form for cooling and transportation purposes. In this manner, a variety of forms of a non-dairy food product may be produced using similar methods and processes.

In certain embodiments, method 200 further includes adding inclusions to the oil/non-dairy mixture before removing air from the mixture. For example, in particular embodiments, one or more of herbs, spices, dried fruit pieces, dried vegetable pieces, nuts, and seeds may be added to the mixture. The addition of such ingredients may enhance the flavor of the non-dairy cheese product and/or change its texture, mouthfeel, consistency, or nutritional profile. These inclusions may also be added to further simulate various dairy cheeses with inclusions.

Modifications, additions, or omissions may be made to method 200 depicted in FIG. 2. Method 200 may include more, fewer, or other steps. For example, steps may be performed in parallel or in any suitable order. While discussed as various components of system 100 performing the steps, any suitable component or combination of components of system 100 may perform one or more steps of the method.

A non-dairy cheese product may be produced using one or more of the embodiments described herein. For example, certain embodiments of system 100 or certain embodiments of method 200 may produce a non-dairy cheese product. Alternatively, different methods and systems may be used to produce various embodiments of a non-dairy cheese product as contemplated by this disclosure.

According to certain embodiments, a non-dairy cheese product includes a fermented non-dairy milk, one or more starches, one or more gums, and oil. The non-dairy milk may be any non-animal-sourced food product liquid or solution. In certain embodiments, the non-dairy milk is one of an almond milk, a cashew milk, a soy milk, a coconut milk, a rice milk, and a flax milk. In particular embodiments, the non-dairy milk is a cream version based on one or more of those types of milk. For example, the non-dairy milk may be a condensed coconut cream. In the context of non-dairy milks, the difference between the beverage form and cream-like form of a non-dairy milk may be the difference in water percentage. For example, a coconut cream may be produced by the same process as producing a beverage coconut milk, except using a higher coconut to water ratio. Alternatively, liquid or cream-like versions of non-dairy milks may be produced using different methods or require additional ingredients.

The fermented non-dairy milk is fermented with lactic acid bacteria. The type of lactic acid bacteria may be chosen to correspond to a particular dairy cheese. For example, a non-dairy cheese product may be produced having a similar taste to a Mozzarella cheese. In that example, the non-dairy milk in the non-dairy cheese product may be fermented using the same strains of lactic acid bacteria as those used to produce the dairy Mozzarella cheese.

A variety of non-dairy cheese products are contemplated in this disclosure. For example, different types or strains of lactic acid bacteria may ferment the non-dairy milk in the non-dairy cheese product, providing a variety of flavor profiles. Some examples of lactic acid bacteria that may be used in producing a non-dairy cheese product include, but are not limited to, *Streptococcus thermophilus, Lactobacillus bulgaricus, Lactococcus lactis*, and *Leuconotoc cremoris* strains. By using fermented non-dairy milk fermented with similar or the same lactic acid bacteria as used in fermenting dairy milk in producing a particular type of dairy cheese, the non-dairy cheese product flavor profile may correspond to that of the particular type of dairy cheese. For example, the non-dairy milk may be fermented with lactic acid bacteria to provide flavor profiles similar to dairy Cheddar cheeses, dairy Mozzarella cheeses, dairy Jack cheeses, etc. In this manner, a non-dairy cheese product may be an improved alternative to other cheese imitation products.

The oil is suspended within the non-dairy cheese product. In a liquid state, the oil forms an emulsion with the non-dairy milk. In particular embodiments, the oil has an average droplet size of 15 micrometers or less within the non-dairy cheese product. The oil may provide the non-dairy cheese product with a fat content similar to dairy cheeses. The oil having small droplet size enhances the textures of the non-dairy cheese product to more closely align with the texture found in various dairy cheeses. As an example, most humans are unable to perceive individual ingredients or textures having a size less than 25 micrometers. With a maximum droplet size of 15 micrometers, the non-dairy cheese product may be perceived as smooth and creamy. In this manner, differences between the non-dairy cheese product and dairy cheese are reduced, and an improved substitute may be provided.

In particular embodiments, the non-dairy cheese product also includes dextrose, sodium citrate, and plant-based protein. These ingredients may be added to the non-dairy cheese product before the non-dairy milk is fermented in order to provide a better substrate in which to culture the bacteria. Microbial substrates provide the nutrients required for the growth, metabolism, and activity of microbial cells which may produce the desired chemical compounds to replicate dairy cheese flavors. Various non-dairy milks or creams may not comprise adequate or optimal nutrients for the growth of lactic acid cultures. As such, including additional ingredients, such as dextrose, sodium citrate, and plant-based protein, may enhance the growth or culturing of the lactic acid bacteria in the non-dairy milk. As a result, the fermentation process may be enhanced, providing a better flavor profile. In this manner, the additional ingredients may provide the non-dairy cheese product with a taste more closely resembling one or more types of dairy cheeses. In addition, these added ingredients may also contribute to the taste of the non-dairy cheese product. For example, sodium citrate may be used as a substrate for certain cultures and produce buttery notes to the flavor profile of the non-dairy cheese product.

In particular embodiments, the non-dairy cheese product has a melting temperature above 40 degrees and below 110 degrees F. In certain embodiments, the non-dairy cheese product has a melting range in a temperature range between 110 and 130 degrees F. The non-dairy cheese product may remain solid at room temperature, but melt when exposed to heat. In this manner, the non-dairy cheese product imitates the physical characteristics of various dairy cheeses. The particular formulation of the non-dairy cheese may control the particular melting temperature. For example, the non-dairy cheese product may contain more or less starch depending on the desired consistency and melting temperature. As another example, various types of oils may be used, which have their own melting temperatures. As a specific example, the oil may be a palm oil with a melting point between 90 degrees and 102 degrees.

In particular embodiments, the non-dairy cheese product includes navy bean flour. As described above, navy bean flour may contribute a bitter and astringent flavor mimicking bitter peptides found in certain dairy cheeses, such as certain aged cheeses.

In particular embodiments, the one or more gums include Xanthan gum and Konjac gum. The use of both Xanthan and Konjac gums provides the non-dairy cheese product with physical characteristics similar to that of dairy cheeses. For example, the Xanthan and Konjac gums may react synergistically to form a thermo-reversible gel. The combination of gums may provide the non-dairy cheese product with firmness similar to that of dairy cheeses. In this manner, the non-dairy cheese product may be more stable and maintain its shape. For example, the non-dairy cheese product with the combination of gums may retain its shape and structure when sliced or shredded. In addition, the combination of gums may stabilize the emulsion of the oil in the non-dairy cheese product.

Starches may be added to the non-dairy cheese product in order to mimic the structure-providing function of the casein in dairy cheeses. Starches may thicken a food product, increasing its viscosity. Different starches may provide the non-dairy food product with different physical characteristics. For example, particular starches may be added to enhance emulsification or allow the non-dairy cheese product to stretch or have string-like properties, e.g., as found in certain Mozzarella cheeses. The amount of starch, or combination of starches, in the non-dairy cheese product may affect its viscosity, emulsion properties, melting temperature, consistency, or texture.

In particular embodiments, the one or more starches in the non-dairy cheese product include a de-branched waxy starch. For example, starches from plants may contain two types of polysaccharides, amylose and amylopectin, which are polymers of glucose. Waxy starch may comprise mostly of amylopectin, which is highly branched and may have a lower tendency of retrogradation as a dissolved component in a food product. Certain enzymes may be used to hydrolyze the alpha-1, 6-D-glycosidic bonds in amylopectin. Using unhydrolyzed waxy starch may make the non-dairy cheese product too viscous when used in large quantities. Thus, for a similar resulting viscosity, a larger amount of de-branched waxy starch may be used compared to unhydrolized waxy starch. In this manner, the de-branched waxy starch may provide the non-dairy cheese product with a consistency similar to dairy cheeses, even without the casein and the structure it provides in dairy cheeses.

While the use of lactic bacteria provides the non-dairy cheese product with a flavor profile similar to the flavor a dairy cheese, additional flavors or colorings may be added to adjust the flavor and/or color of the non-dairy cheese product. For example, in particular embodiments, the non-dairy cheese product also includes salt, lactic acid, citric acid, yeast extracts, natural flavors, and Annatto. The addition of such ingredients may enhance the underlying flavor profile provided by the other ingredients of the non-dairy cheese. Furthermore, Annatto, or other colorings, may be added to provide the non-dairy cheese product with a color matching the target dairy cheese. For example, a non-dairy cheese product produced to correspond to a yellow cheddar cheese may include Annatto, which imparts a yellow-orange color. Providing matching coloring not only enhances the visual appearance of the non-dairy cheese product to match consumer expectations, but may also enhance flavor perception through visual priming.

Due to its composition, certain embodiments of the non-dairy cheese product may be sliced, shredded, stretched or melted. The combination of certain gums, starches and other ingredients may maintain the integrity of the non-dairy cheese product when cut, sliced, chopped, shredded, etc. In particular embodiments, the non-dairy cheese product comprises a sliced cheese product or a shredded cheese product. For example, the non-dairy cheese product may be individual slices of non-dairy cheese. As another example, the non-dairy cheese may be a shredded form of the non-dairy cheese. Additionally, the non-dairy cheese product may be processed using equipment or devices which mechanically cut, slice, dice, chop, or otherwise shape dairy cheeses. In this manner, the non-dairy cheese product may resemble dairy cheese not only in taste, but also in its physical characteristics and its different uses.

The composition of the non-dairy cheese product may be described in relative weights or volumes of various components of the final non-dairy cheese product. For example, Table 1 depicted below provides ranges of the relative weight of different ingredients of the non-dairy cheese product, according to particular embodiments.

TABLE 1

| Ingredient | Relative weight (%) |
| --- | --- |
| Fermented Non-dairy milk | 30-60% |
| Starches | 15-25% |
| Gums | 0-1% |
| Oil | 10-30% |
| Flavorings/Colorings | 0-5% |

In certain embodiments, the non-dairy cheese product comprises 45-55% fermented non-dairy milk, 15-22% starches, 0-0.5% gums, 20-30% oil, and 2-4% flavoring/colorings. Non-dairy products in these ranges may simulate the properties of certain dairy cheeses more accurately. For example, a non-dairy cheese product containing too little oil may not be able to replicate the taste and texture of trapped dairy milk fats in some dairy cheeses. As another example, a non-dairy cheese product with too much gum may result in prevent the non-dairy cheese product from melting at the correct temperatures or shredding similarly to a dairy cheese it is intending to replicate.

In particular embodiments, different ranges of the ingredients may be used to produce non-dairy cheese products with different physical properties. For example, the non-dairy cheese product may simulate a mayonnaise or a cheese sauce. In these cases, different ranges of weights may be used. For example, Table 2 depicted below provides example ranges of the relative weights of different components of the non-dairy cheese product, according to further embodiments.

TABLE 2

| Ingredient | Relative weight (%) |
| --- | --- |
| Fermented Non-dairy milk | 60-90% |
| Starches | 3-10% |
| Gums | 0-0.5% |
| Oil | 10-30% |
| Flavorings/Colorings | 0-5% |

The systems and methods described herein may include one or more technical advantages. For example, certain embodiments of the present disclosure may provide one or more technical advantages. As an example, fermenting non-dairy milk with lactic acid bacteria typically used in dairy cheese production creates a flavor profile similar to that of the dairy cheese. Furthermore, certain strains of lactic acid bacteria may be chosen to simulate the flavor profiles of different dairy cheeses. For example, the strains of bacteria used to produce a certain dairy Mozzarella cheese may be used to ferment the non-dairy milk in order to produce a non-dairy cheese with flavors similar to the dairy Mozzarella cheese.

In addition, oil may be mixed with the fermented non-dairy milk in order to increase the fat content of the non-dairy cheese product. By mixing the oil into the fermented non-dairy milk through an inline high shear mixer, the average droplet size of the oil may be reduced to 15 micrometers or less. Reducing the droplet size not only enhances emulsion stability of the oil in the non-dairy milk, but also provides an optimal mouthfeel and consistency of the non-dairy cheese product.

As another example, certain gums and starches may be added to the fermented non-dairy milk. Certain starches, such as de-branched waxy starches, may replace the utility of casein in dairy cheese in order to provide structure and certain physical properties to the non-dairy cheese. Likewise, gums, e.g. Konjac and Xanthan gums, may be added to stabilize the emulsion of oil in the fermented non-dairy milk and provide the non-dairy cheese with firmness allowing the non-dairy cheese to be shredded or sliced.

Although the present disclosure has been described with several embodiments, numerous changes, variations, alterations, transformations, and modifications can be suggested to one skilled in the art, and it is intended that the present disclosure encompass such changes, variations, alterations, transformations, and modifications as fall within the scope of the appended claims.

What is claimed is:

1. A non-dairy cheese product, comprising:
   fermented non-dairy milk, fermented by lactic acid bacteria;
   one or more starches;
   flavoring comprising navy bean flour;
   one or more gums; and
   oil, wherein the oil forms an emulsion in the non-dairy milk, the oil having a droplet size of 15 micrometers or less.

2. The product of claim 1, further comprising dextrose, sodium citrate, and plant-based protein.

3. The product of claim 1, wherein the non-dairy cheese product has a melting range between 110 degrees and below 130 degrees Fahrenheit.

4. The product of claim 1, wherein the flavoring comprises no more than 5% of the non-dairy cheese product.

5. The product of claim 1, wherein the one or more gums comprise no more than 0.5% of the non-dairy cheese product, the one or more gums comprising xanthan gum and Konjac gum.

6. The product of claim 1, wherein the one or more starches comprise a de-branched waxy starch.

7. The non-dairy cheese product of claim 1, further comprising salt, lactic acid, citric acid, yeast extracts, natural flavors, and Annatto.

8. The product of claim 1, wherein the non-dairy cheese product comprises a sliced cheese product or a shredded cheese product.

9. The product of claim 1, wherein the non-dairy milk comprises one or more of an almond milk, a cashew milk, a soy milk, a coconut milk, a rice milk, and a flax milk.

10. The product of claim 1, wherein the fermented non-dairy milk comprises non-dairy milk and the navy bean flour, wherein the navy bean flour is added to the non-dairy milk before fermentation.

* * * * *